US007162701B1

(12) United States Patent
Seyffert

(10) Patent No.: US 7,162,701 B1
(45) Date of Patent: Jan. 9, 2007

(54) USER INTERFACE FOR A DECISION SUPPORT SYSTEM

(75) Inventor: Fred Seyffert, Littleton, CO (US)

(73) Assignee: Veripoint, LLC, Littleton, CO (US)

( * ) Notice: Subject to any disclaimer, the term of this patent is extended or adjusted under 35 U.S.C. 154(b) by 759 days.

(21) Appl. No.: 10/359,109

(22) Filed: Feb. 4, 2003

Related U.S. Application Data

(60) Provisional application No. 60/354,259, filed on Feb. 4, 2002.

(51) Int. Cl.
  *G06F 3/00* (2006.01)
  *G06F 9/00* (2006.01)
  *G06F 17/00* (2006.01)

(52) U.S. Cl. .................... 715/854; 715/963; 715/968; 345/440; 707/3; 707/4; 707/10; 707/102

(58) Field of Classification Search ................ 715/854, 715/963, 968, 808, 762, 763, 764, 843; 705/7; 345/440; 707/3, 4, 7, 10, 102
See application file for complete search history.

(56) References Cited

U.S. PATENT DOCUMENTS

| 5,790,116 | A  | * | 8/1998  | Malone et al. ............... 715/763 |
| 6,581,068 | B1 | * | 6/2003  | Bensoussan et al. ...... 707/104.1 |
| 6,636,870 | B1 | * | 10/2003 | Roccaforte ............... 707/104.1 |
| 6,766,325 | B1 | * | 7/2004  | Pasumansky et al. ........ 707/101 |
| 6,768,986 | B1 | * | 7/2004  | Cras et al. ...................... 707/2 |
| 6,831,668 | B1 | * | 12/2004 | Cras et al. .................... 715/853 |
| 2001/0032182 | A1 | * | 10/2001 | Kumar et al. .................. 705/40 |
| 2002/0059195 | A1 | * | 5/2002  | Cras et al. ...................... 707/3 |
| 2002/0059264 | A1 | * | 5/2002  | Fleming et al. ............. 707/100 |
| 2004/0034615 | A1 | * | 2/2004  | Thomson et al. ............... 707/1 |
| 2005/0080802 | A1 | * | 4/2005  | Cras et al. ................... 707/100 |

OTHER PUBLICATIONS

White Paper, "An Introduction to OLAP: Multidimensional Terminology and Technology".

* cited by examiner

*Primary Examiner*—Raymond J. Bayerl
*Assistant Examiner*—Anita Datta Chaudhuri
(74) *Attorney, Agent, or Firm*—Hamilton & Desanctis

(57) ABSTRACT

Methods are provided for navigation user interface mechanisms. In one embodiment, a directed summary of (i) what caused the value of a selected cell within a tabular view of data; or (ii) context into which the value of the selected cell fits as part of a larger overall picture is provided by displaying at least a partial hierarchy of child/parent views relating to the value of the selected cell, then the end user may navigate to a particular level of detail within the hierarchy of preaggregated data that is desired by selecting an appropriate child/parent view. In another embodiment, period queries are specified with reference to a dialog displaying a calendar view from which date groups to be compared may be selected. The dialog receives information identifying a period associated with each date group to be compared. The periods can be either asymmetrical or symmetrical with respect to each other.

13 Claims, 10 Drawing Sheets

USER INTERFACE FOR A DECISION SUPPORT SYSTEM

This application claims the benefit of U.S. Provisional Application No. 60/354,259, filed Feb. 4, 2002, entitled "User Interface for a Decision Support System" which is hereby incorporated by reference in its entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention related generally to database applications and associated analytical processing of business data. More particularly, embodiments of the present invention relate to user interface enhancements and functionality for navigating up and down through successive layers of detail (on-demand drilling) via pop-up menus, for example, and for support of unique comparison operators of layers of detail including, elaborate period queries (e.g., asymmetric period selection) via a single dialog.

2. Description of the Related Art

While vast improvements have been made in relational database management systems (RDBMS) in terms of supporting dimensional data analysis, they still suffer from performance and scalability issues. Today's On-Line Analytical Processing (OLAP) applications have many limitations in terms of storage efficiency, performance, and usability. Notably, navigating across and within business data categories, subsets, groups, departments, organization-wide, etc. typically requires extensive end-user training and requires leaving one view and creating another. Consequently, existing non-intuitive navigation mechanisms can leave users disoriented and confused wondering where they are within a given hierarchy. Additionally, built-in assumptions regarding underlying data usage and their associated brittle architectures unduly constrain user interaction and manipulation of the data and thereby reduce flexibility in terms of presenting desired views and/or data comparison operations.

In general, it would be desirable to provide users with more flexibility and simplicity in terms of view generation and data manipulations.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements and in which:

FIGS. 4A and 4B are exemplary screen shots depicting a user interface mechanism for enabling "What Caused This?" functionality in the context of a view into unstructured, pre-aggregated data forms according to one embodiment of the present invention.

FIG. 5 is an exemplary screen shot depicting a user interface mechanism for enabling "What Is This Part Of?" functionality according to one embodiment of the present invention.

FIGS. 6A–6D are exemplary screen shots depicting a user interface mechanism for enabling novel period query generation according to one embodiment of the present invention.

DETAILED DESCRIPTION

Apparatus and methods are described for providing more intuitive and flexible user interface mechanisms in the context of a decision support system front end. Broadly stated, embodiments of the present invention seek to support more elaborate and flexible comparison operations and provide users with more intuitive mechanisms for navigating successive layers of detail. According to one embodiment, novel user interface mechanisms are provided that seek to facilitate efficient navigation up and down through successive layers of detail on demand while providing access to information regarding context so as to allow the user to understand how particular cells of interest fit within the larger picture.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to a particular type of decision support system front end where unstructured pre-aggregated data forms are employed, the present invention is equally applicable to various other Business Intelligence and Analytical applications in which fast, flexible data summarization, analysis, and navigation is desirable, such as multidimensional data analysis systems, relational database systems, and the like.

Figure 1A:
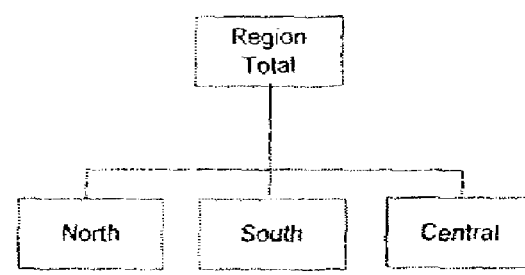
FIGS. 1A and 1B conceptually illustrate a simple dimensionally structured database and corresponding hierarchies.
Figure 1B:
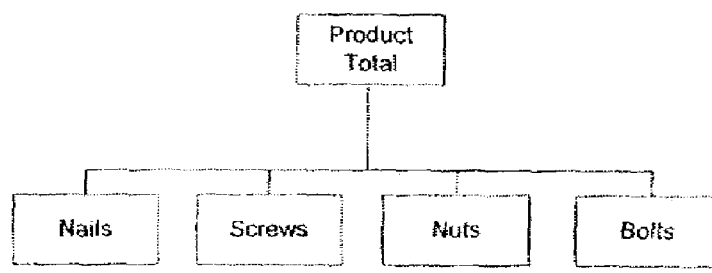

FIGS. 1A and 1B conceptually illustrate a simple multi-dimensional database and corresponding hierarchies. In the current example, total sales of units of a variety of hardware fasteners, e.g., nails, screws, nuts and bolts are tracked by region, e.g., North, South and Central. As illustrated by the hierarchical relationship of FIG. 1B, the region total comprises the consolidated total of product sales in the North, South and Central regions and the product total is the aggregate of unit sales of nails, screws, nuts, and bolts.

Figure 2:
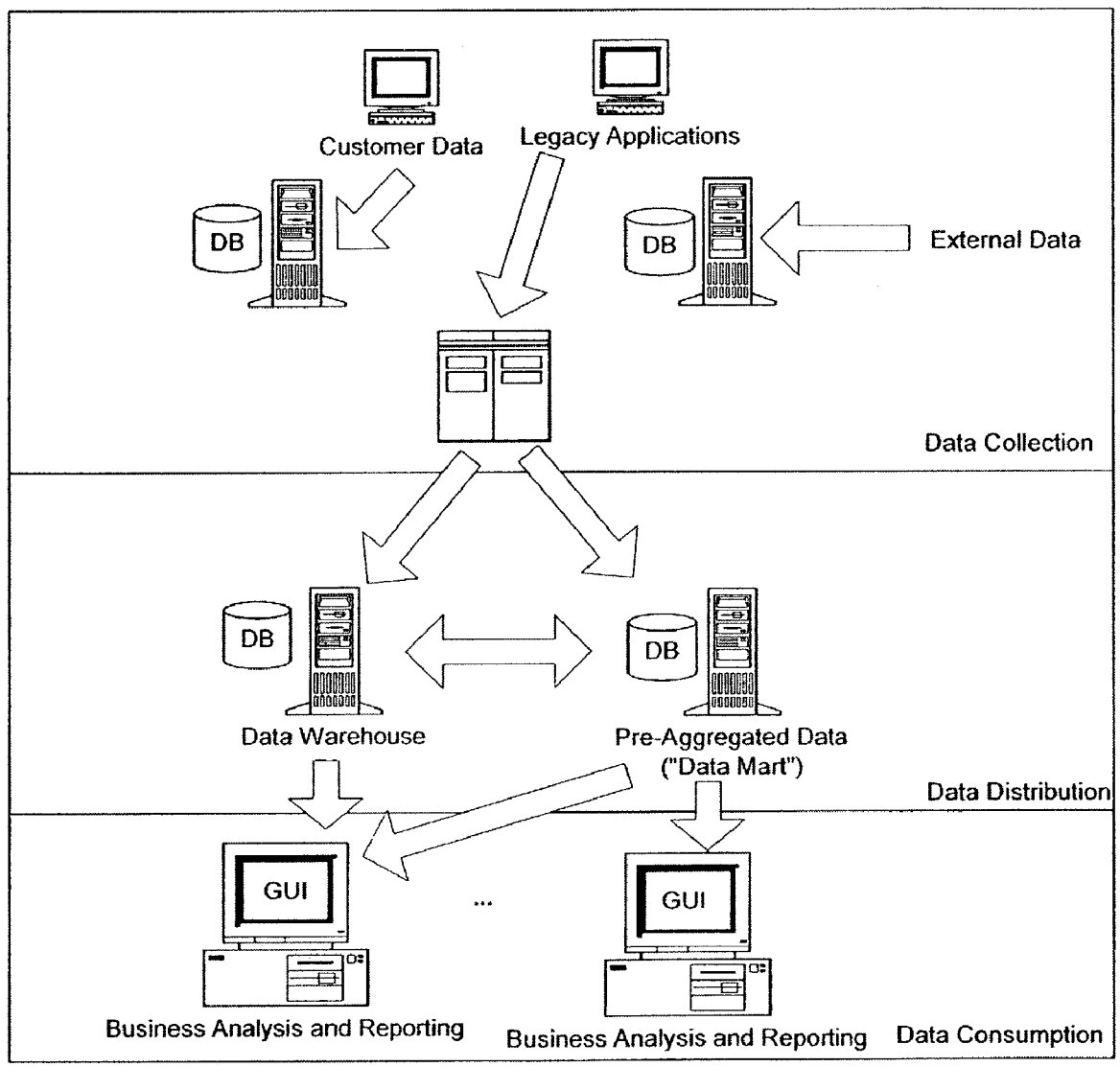
FIG. 2 is a block diagram representing an exemplary enterprise architecture in which an embodiment of the present invention may be implemented.

FIG. 2 is a block diagram representing an exemplary enterprise architecture in which embodiment of the present invention may be implemented. Typically, the decision support system front end and user interface described herein would reside in the data consumption block. However, it is contemplated in alternative embodiments, the decision support system front end described herein may be provided by an Application Service Provider (ASP) as part of a fully integrated outsourced data synthesis, analysis, consolidation, and presentation service that would stream query results to an end-user's browser, for example.

Note that in this exemplary enterprise architecture, in order to facilitate understanding, the various functional units are generally depicted as if they were each a single device or process. However, each may actually comprise multiple physical and/or logical devices connected in a distributed architecture, and the various functions performed may actually be distributed among multiple devices and/or processes. Additionally, in alternative embodiments, the functions performed by the various processes may be consolidated and/or distributed differently than as shown. For example, any function can be implemented on any number of machines or on a single machine. Also, any process may be divided across multiple machines.

Figure 3:
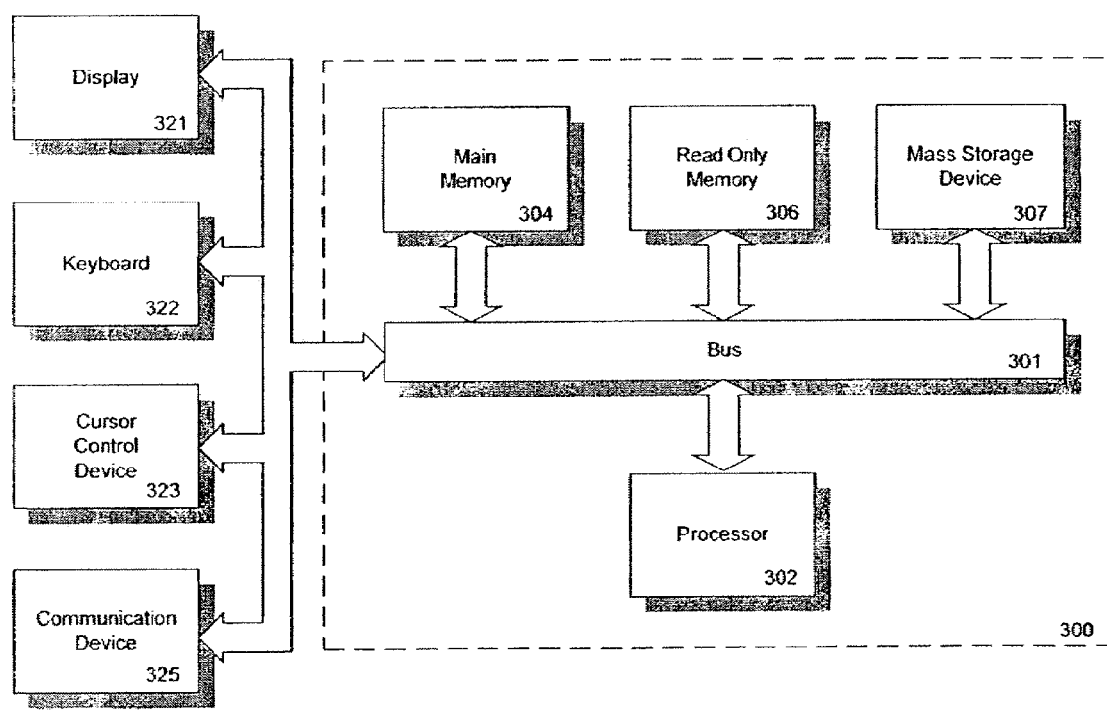
FIG. 3 is an example of a computer system upon which one embodiment of the present invention may be implemented.

An exemplary machine in the form of a computer system 300, representing an exemplary server or client system, in which features of the present invention may be implemented will now be described with reference to FIG. 3. Computer system 300 comprises a bus or other communication means 301 for communicating information, and a processing means such as processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variable or other intermediate information during execution of instructions by processor 302. Computer system 300 also comprises a read only memory (ROM) and/or other static storage device 306 coupled to bus 301 for storing static information and instructions for processor 302.

A data storage device 307 such as a magnetic disk or optical disc and its corresponding drive may also be coupled to computer system 300 for storing information and instructions. Computer system 300 can also be coupled via bus 301 to a display device 321, such as a cathode ray tube (CRT) or Liquid Crystal Display (LCD), for displaying information to a computer user. For example, a GUI may facilitate problem or process modeling or results of executing an automatically generated software program may be presented on the display device 321.

Typically, an alphanumeric input device 322, including alphanumeric and other keys, is coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

One or more communication ports 325 may also be coupled to bus 301 for allowing communication and exchange of information to/from with the computer system 300 by way of a Local Area Network (LAN), Wide Area Network (WAN), Metropolitan Area Network (MAN), the Internet, or the public switched telephone network (PSTN), for example. The communication ports 325 may include various combinations of well-known interfaces, such as one or more modems to provide dial up capability, one or more 10/100 Ethernet ports, one or more Gigabit Ethernet ports (fiber and/or copper), or other well-known interfaces, such as Asynchronous Transfer Mode (ATM) ports and other interfaces commonly used in existing LAN, WAN, MAN network environments. In any event, in this manner, the computer system 300 may be coupled to a number of other network devices, clients and/or servers via a conventional network infrastructure, such as a company's Intranet and/or the Internet, for example.

The present invention is related to the use of computer system 300 to execute a decision support system, such as a multidimensional data analysis system front end and/or a multidimensional engine, to perform calculations across groups or pre-aggregated data. As computer system 300 executes the decision support system front end, the processor 302 may access active data stored in a database of unstructured, pre-aggregated data forms on a server that includes data extracted and summarized from legacy systems, relational databases, transaction processing systems, and/or from end-users. Typically, the database is stored in whole or in part on disk associated with the client or server, but according to one embodiment, RAM-based data structures or caching may be provided for greater performances.

Figure 4A:
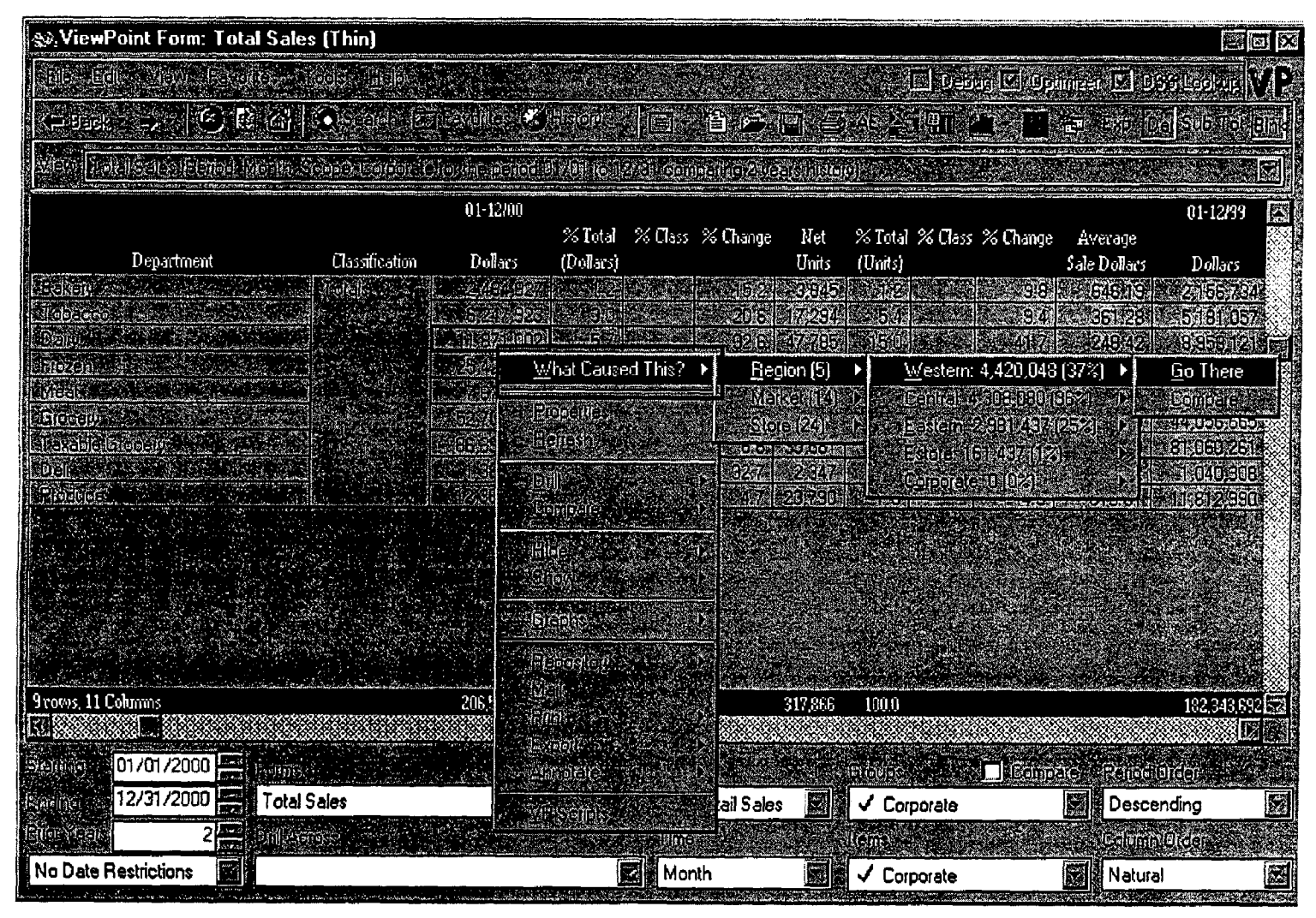
Figure 4B:
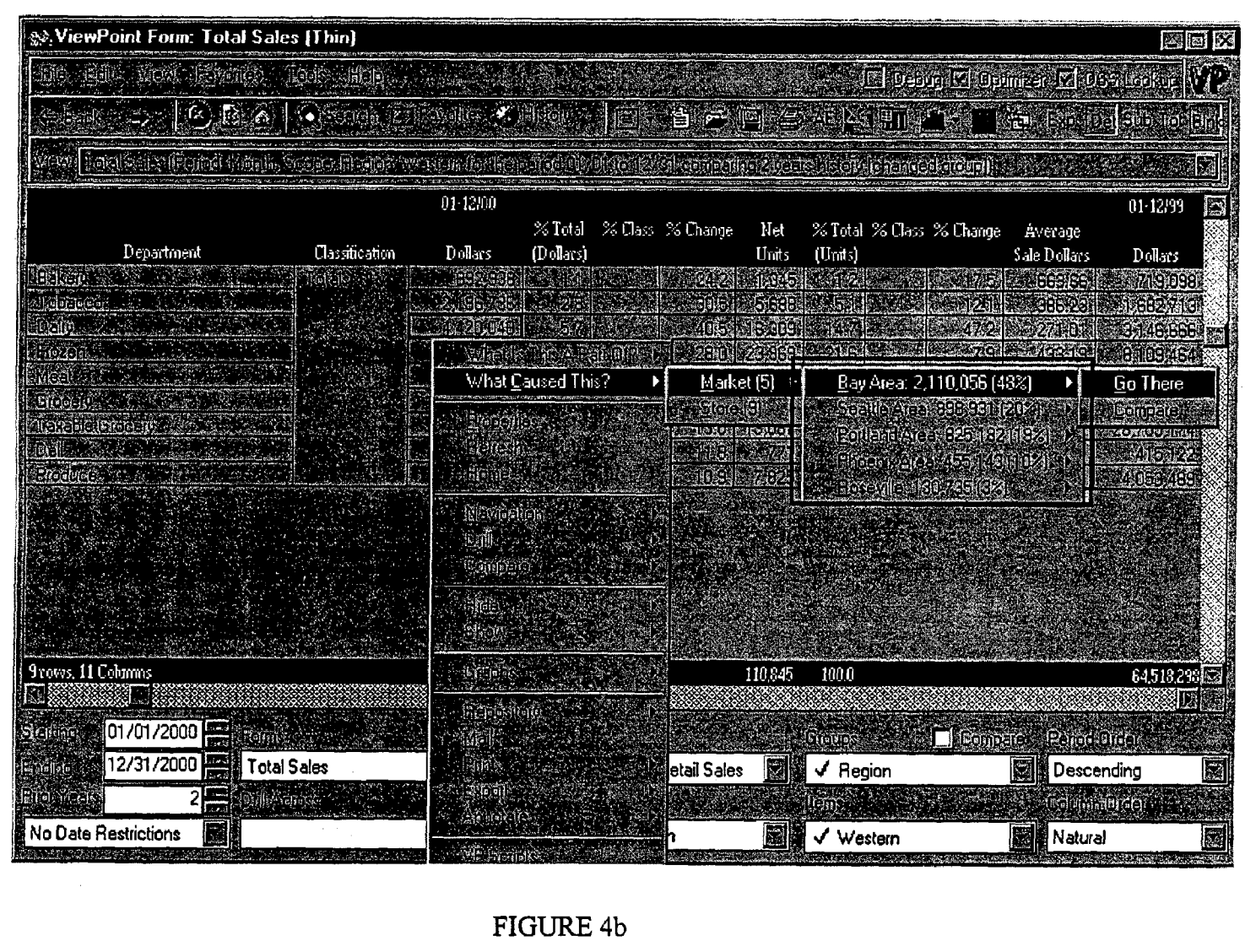

FIGS. 4A and 4B are exemplary screen shots depicting a user interface mechanism for enabling "What Caused This?" functionality according to one embodiment of the present invention. In this example, any given cell in the view supports supply of an immediate, directed summary of the situation that caused the cell's value in response to a user input event, such as a function key, mouse click or double click, etc. In general, the "What Caused This?" feature allows complete or partial hierarchy of "child" views to be displayed upon selection. Advantageously, in this manner, the end user may easily navigate to whatever level of detail that is desired without closing the current view and waiting for another view to be created. For example, in a multidimensional database environment, the end user could more easily navigate to a given dimension of the multidimensional data without losing context. According to one embodiment, in addition to looking up and presenting the "children" of a particular view, the children may also be sorted for convenience to the end-user. In the example illustrated, the children of the particular view are ranked in increasing order according to their percentage contribution. However, it is contemplated that in alternative embodiments, the children may be ranked or sorted in decreasing order according to their percentage contribution, according to their value, or even alphabetically by the dimension name. Additionally, in one embodiment, subsequent navigation to lower tiers in a given hierarchy automatically inherit the parent view's settings with regard to one or more of sorting, querying, etc. Of course, when users are in a specific item in a hierarchy, they only see "child" items that relate to where they are. This means that numbers always add up—eliminating potential for confusion. Finally, since none of these views, the hierarchy, or the software definition are code-based, the data is always dynamic. This means that adding a region, market, store (or any other tier) is transparent to both current and historical applications already in use throughout the enterprise.

Figure 5:
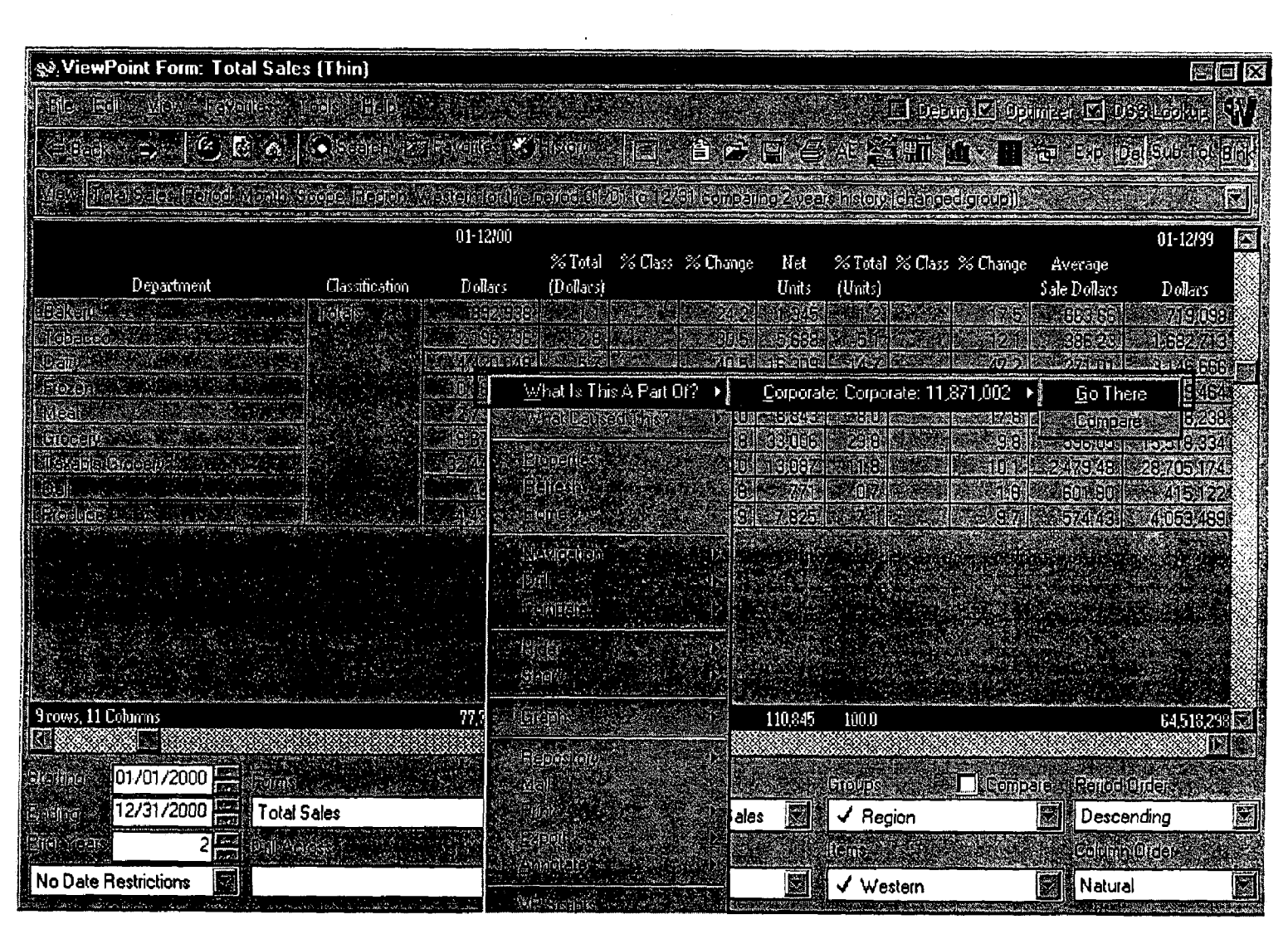

FIG. 5 is an exemplary screen shot depicting a user interface mechanism for enabling "What Is This Part Of?" functionality according to one embodiment of the present invention. In this example, any given cell in the view supports supply of an immediate, directed summary of the context in which that cell fits into as part of the larger overall picture. Advantageously, in this manner, the user can keep from becoming lost when they navigate deeply into the hierarchy. Additionally, it allows the user to discover the path that led them to the view that is currently being displayed.

Figure 6A:
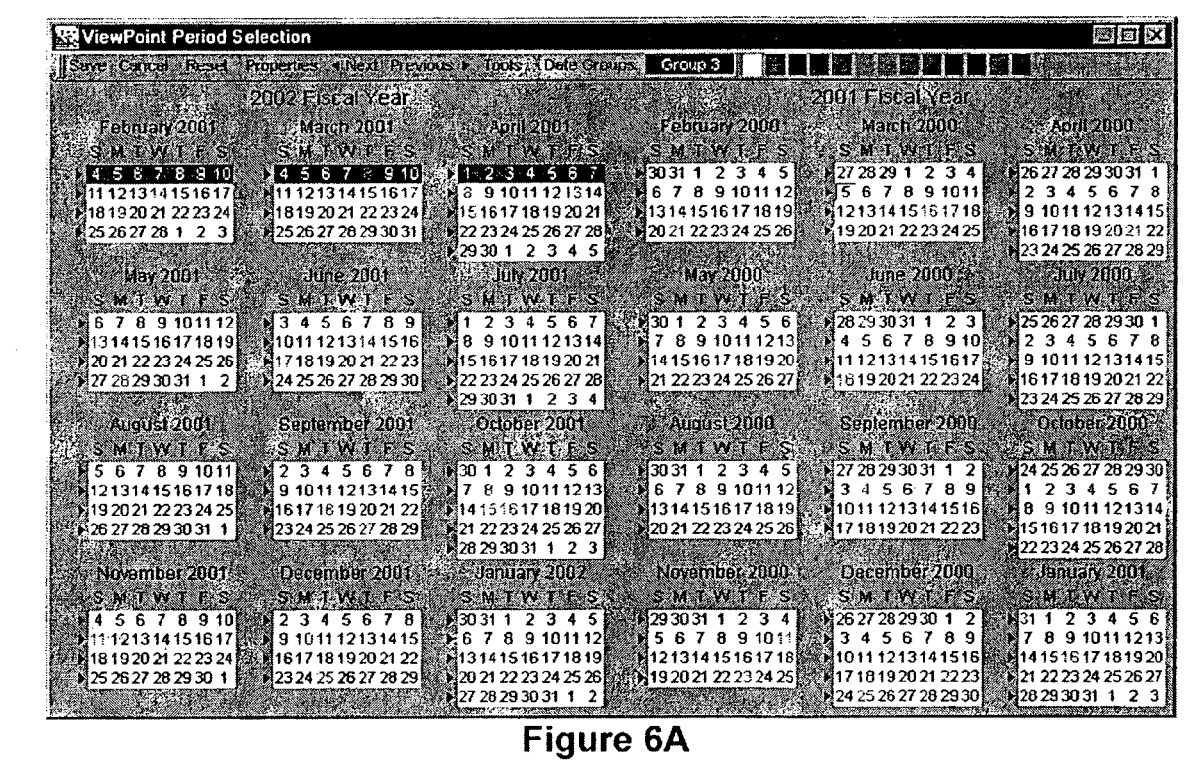
Figure 6B:
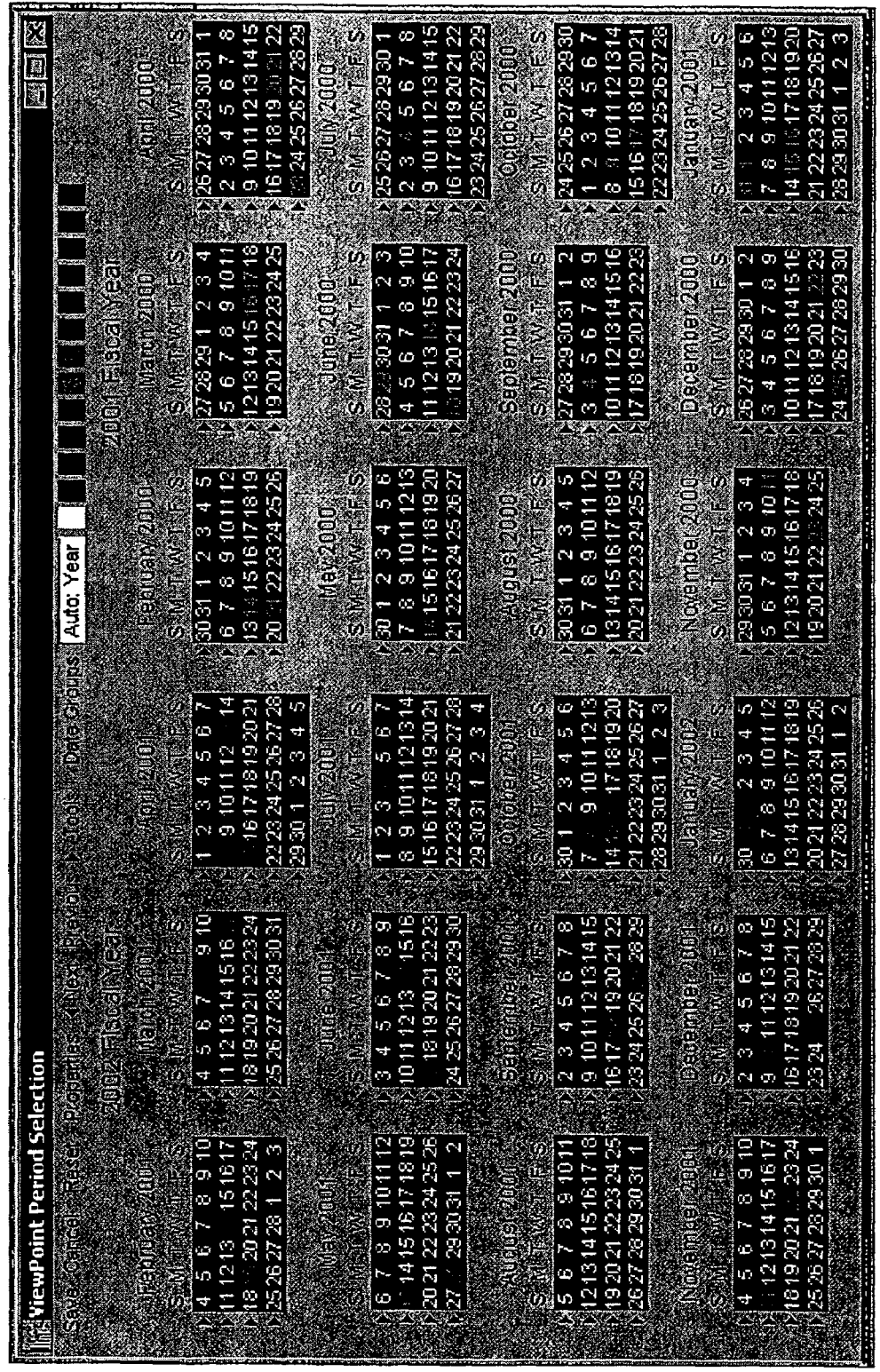
Figure 6C:
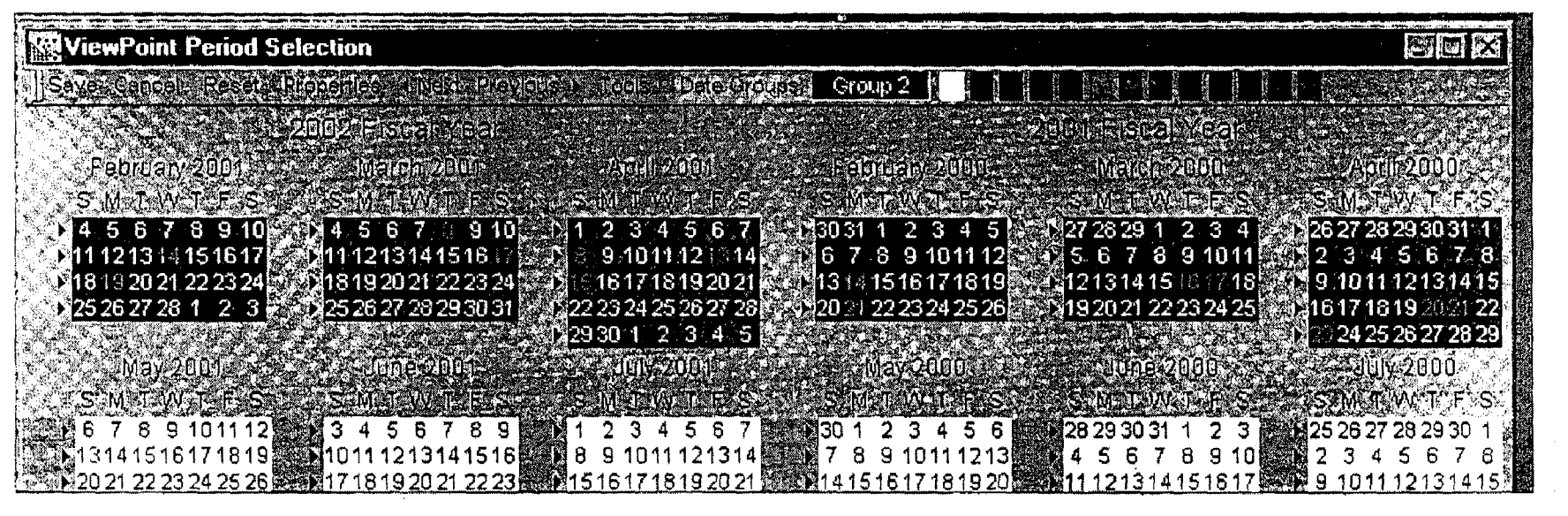
Figure 6D:
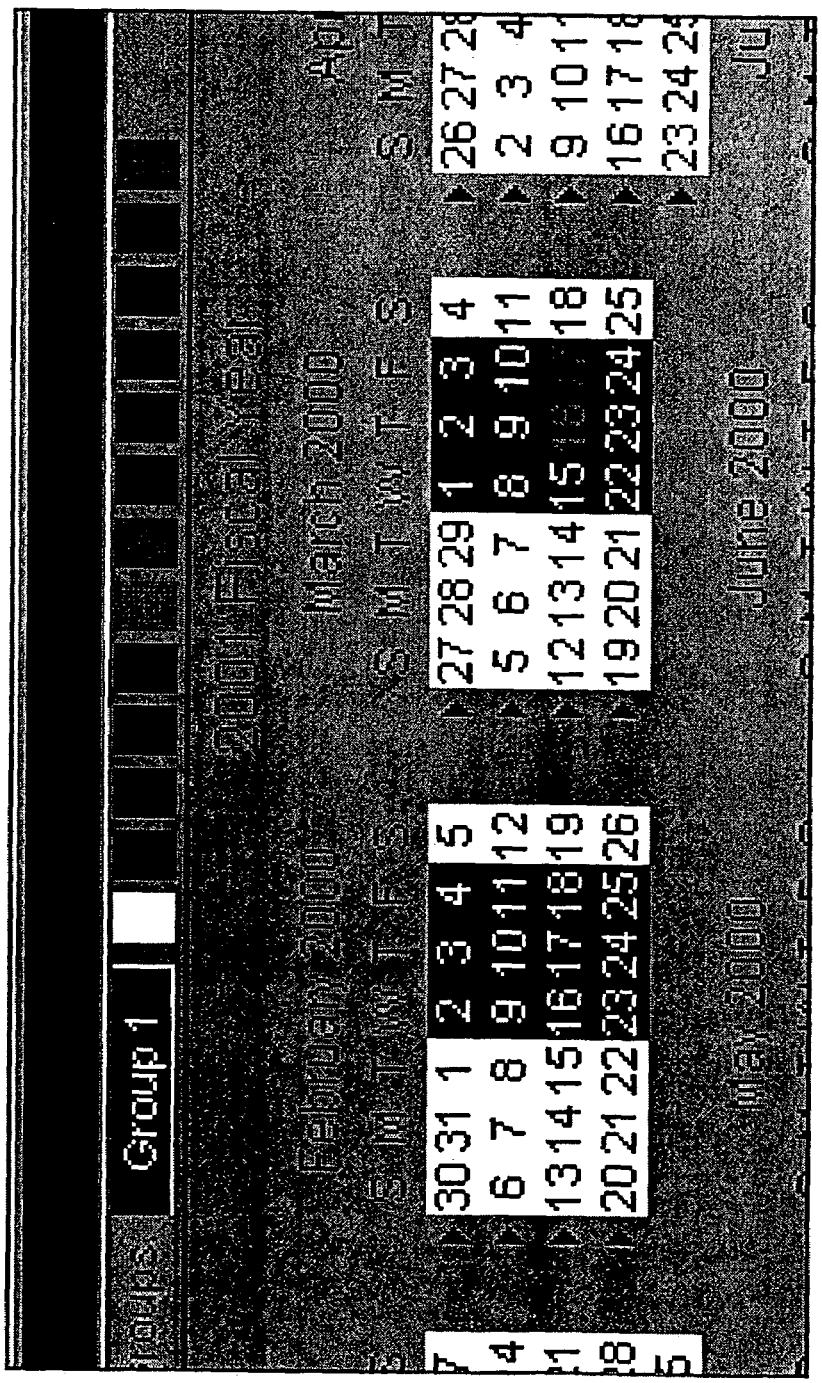

FIGS. 6A–6D are exemplary screen shots depicting a user interface mechanism for enabling novel period query generation according to one embodiment of the present invention. In FIG. 6A, three date groups have been established for comparison, a week of February 2001, a week of March 2001, and a week of April 2001 via a simple and intuitive period selection dialog that may represent the different date groups with different colors or highlighting, for example. In FIG. 6B, two date groups have been established for comparison, the fiscal year of 2002 (February 2001 to January 2002) and the fiscal year of 2001 (February 2000 to January 2001). In FIG. 6C, in three mouse clicks a request has been expressed for a comparison of February to March to April across two years. In FIG. 6D, a comparison request has been made to compare Wednesdays in February and March to Thursdays and Fridays in the same two months. Advantageously, in this manner users are able to specify extremely elaborate period queries. Importantly, asymmetric periods may also be selected and even more complicated requests like "ten days before Mother's Day for the last three years" are quick and easy in the context of the dialog depicted.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
    presenting a first tabular view of data from a particular level of a hierarchy of pre-aggregated data stored in a pre-aggregated form, the first tabular view including one or more data categories, each of the one or more data categories associated with one or more cells each depicting a consolidated value based upon data corresponding to one or more child members associated with the cell;
    responsive to selection, by an end user, of a cell of the one or more cells, while maintaining the first tabular view, providing an interactive nested menu in the form of a singular control depicting a directed summary of what caused the value of the selected cell by displaying one or more dimension members of a sub-cube associated with the selected cell and an indication regarding a relative contribution of each of the one or more dimension members to the value of the selected cell; and
    allowing the end user to navigate to a particular level of detail within a plurality of partial hierarchies associated with the one or more dimension members that is desired while maintaining context by displaying sub-dimension members of the one or more dimension members responsive to end user input and retaining the first tabular view until at least an input event from the end user representing selection of a partial hierarchy of the plurality of partial hierarchies to be navigated to is received and then presenting a second tabular view of data from the selected partial hierarchy responsive to the selection.

2. The method of claim 1, wherein said providing a directed summary further comprises sorting the one or more dimension members.

3. The method of claim 2, wherein the one or more dimension members are sorted according to their percentage contribution to the value of the selected cell.

4. The method of claim 1, wherein the hierarchy of pre-aggregated data comprises a database.

5. The method of claim 4, wherein the database comprises a multidimensional database.

6. The method of claim 1, wherein said presenting a second tabular view of data from the selected partial hierarchy comprises inheriting settings of the first tabular view.

7. The method of claim 1, wherein the interactive nested menu is presented in the form of one or more pop-up menus.

8. A method comprising:
    presenting a first tabular view of data from a particular level of a hierarchy of pre-aggregated data, the first tabular view including one or more data categories, each of the one or more data categories associated with one or more cells each depicting a value representing a subset of data that contributes to an aggregated value of one or more parent members of the cell;
    responsive to selection, by an end user, of a cell of the one or more cells, providing an interactive nested menu in the form of a singular control depicting a directed summary of context into which the value of the selected cell fits as part of a larger overall picture of the hierarchy by retaining the first tabular view while displaying (i) one or more dimension members that are dependent upon the value of the selected cell and (ii) relative contributions of the one or more dimension members within a higher hierarchical level of the pre-aggregated data; and
    allowing the end user to navigate to a particular level of detail within a plurality of partial hierarchies associated with the one or more dimension members that is desired by displaying sub-dimension members of the one or more dimension members responsive to end user input and retaining the first tabular view until at least an input event from the end user representing selection of a partial hierarchy of the plurality of partial hierarchies to be navigated to is received and then presenting a second tabular view of data from a selected parent view responsive to the selection.

9. The method of claim 8, wherein said providing a directed summary further comprises sorting the one or more dimension members.

10. The method of claim 8, wherein the hierarchy of pre-aggregated data comprises a database.

11. The method of claim 10, wherein the database comprises a multidimensional database.

12. The method of claim 8, wherein said presenting a second tabular view of data from the selected partial hierarchy comprises inheriting settings of the first tabular view.

13. The method of claim 8, wherein the interactive nested menu is presented in the form of one or more pop-up menus.

* * * * *